July 3, 1962
C. E. ACKLEY
3,042,183
ARTICLE HANDLING APPARATUS
Filed April 3, 1959
5 Sheets-Sheet 1
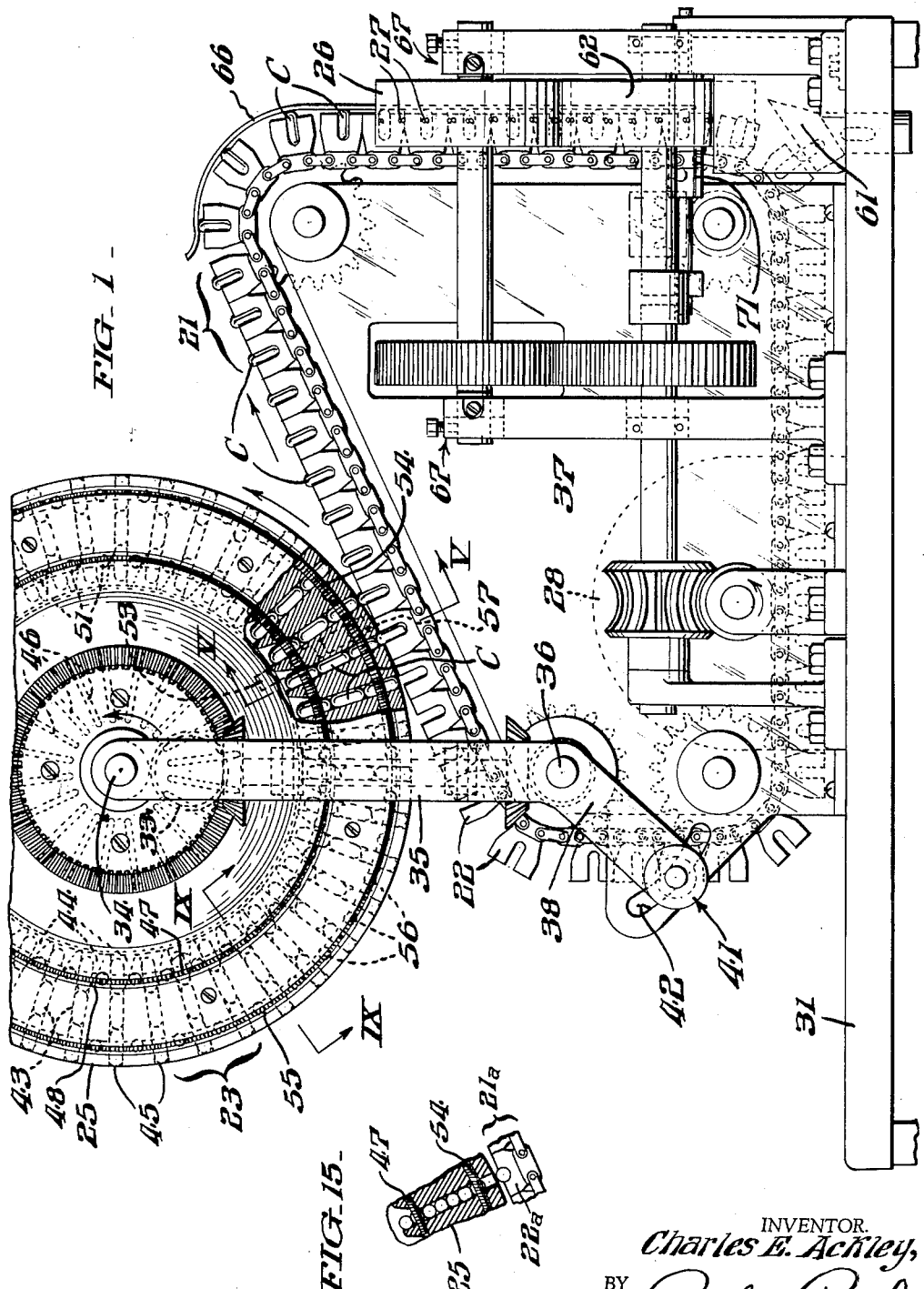
INVENTOR.
Charles E. Ackley,
BY Paul & Paul
ATTORNEYS.

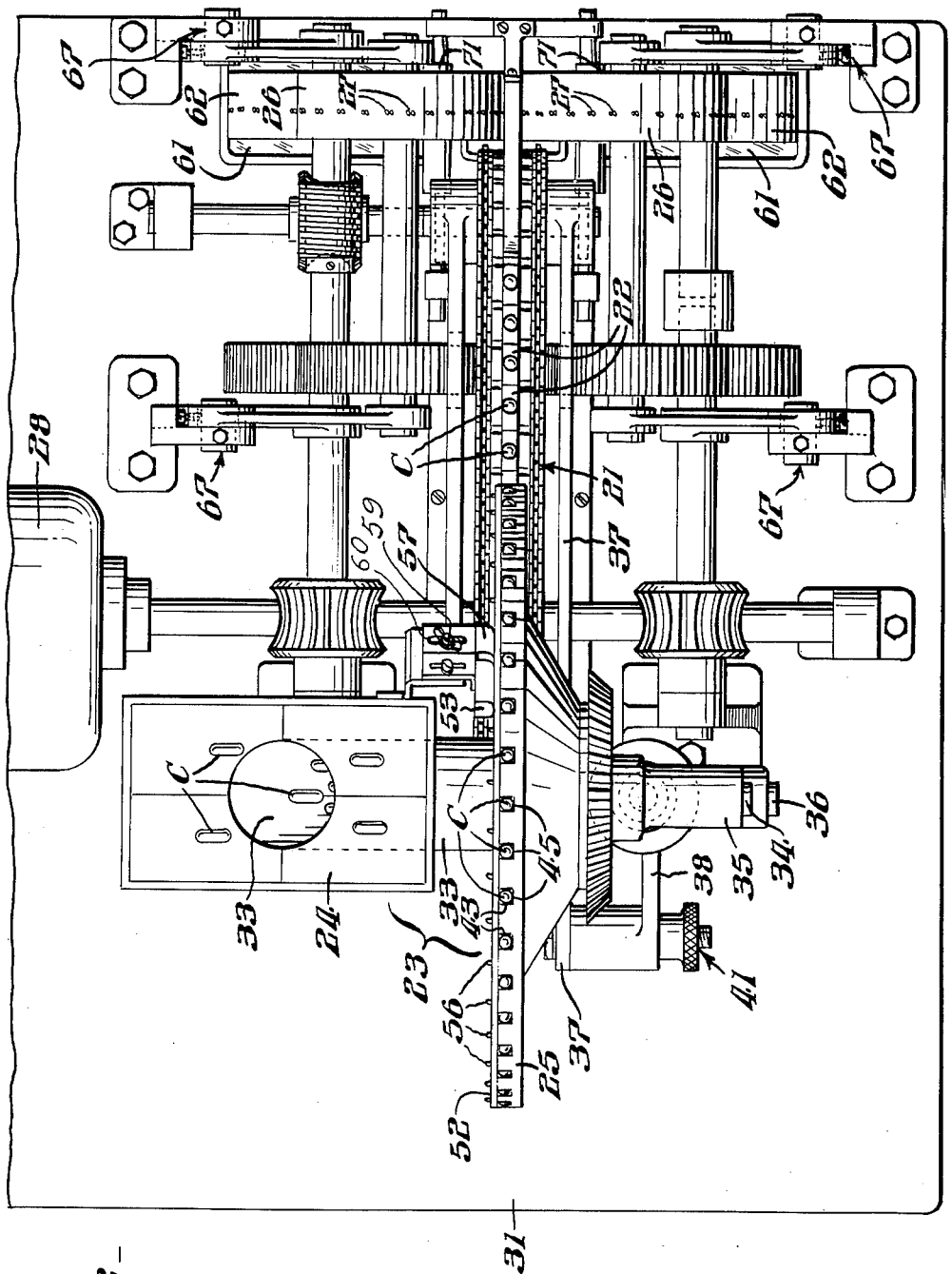

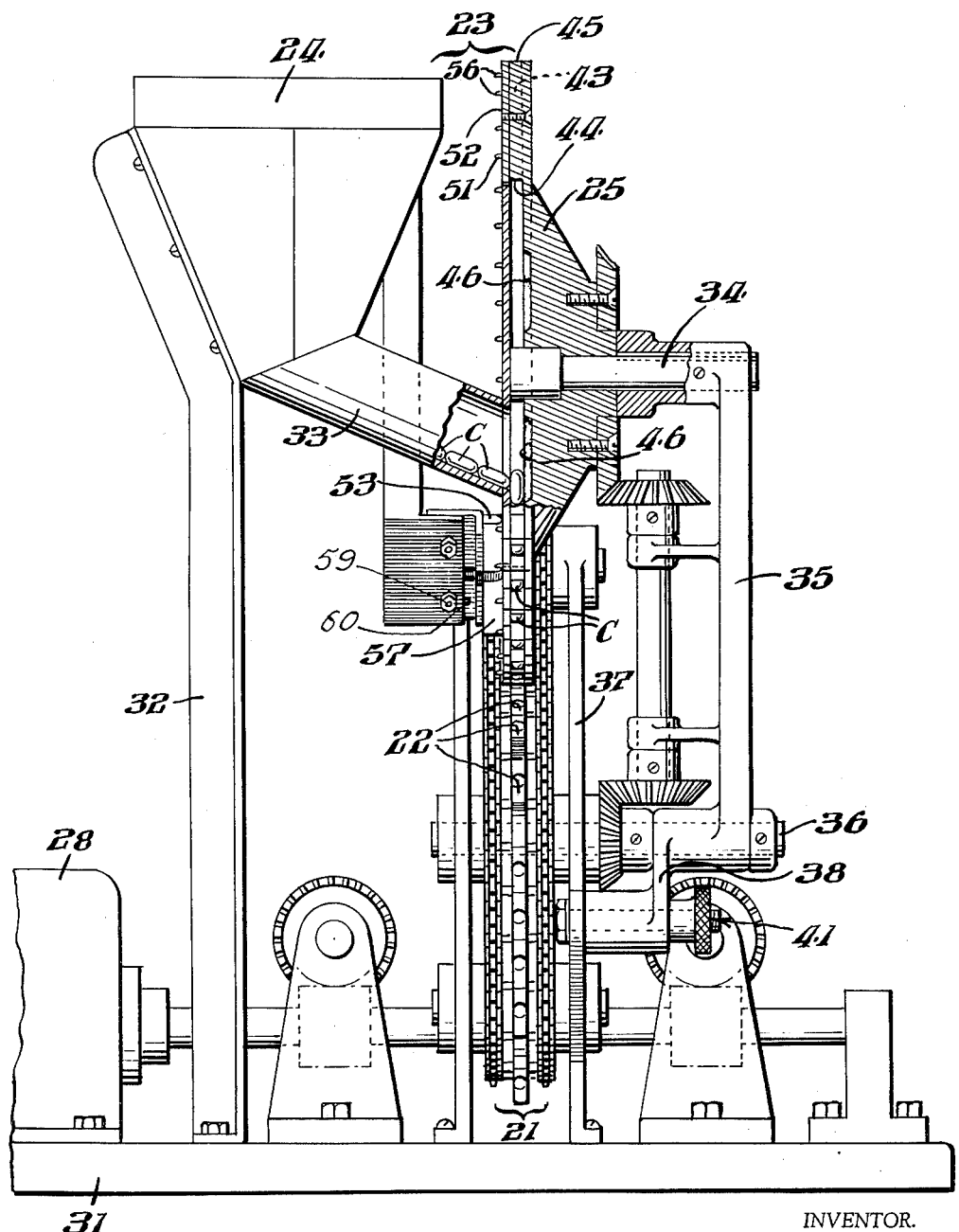

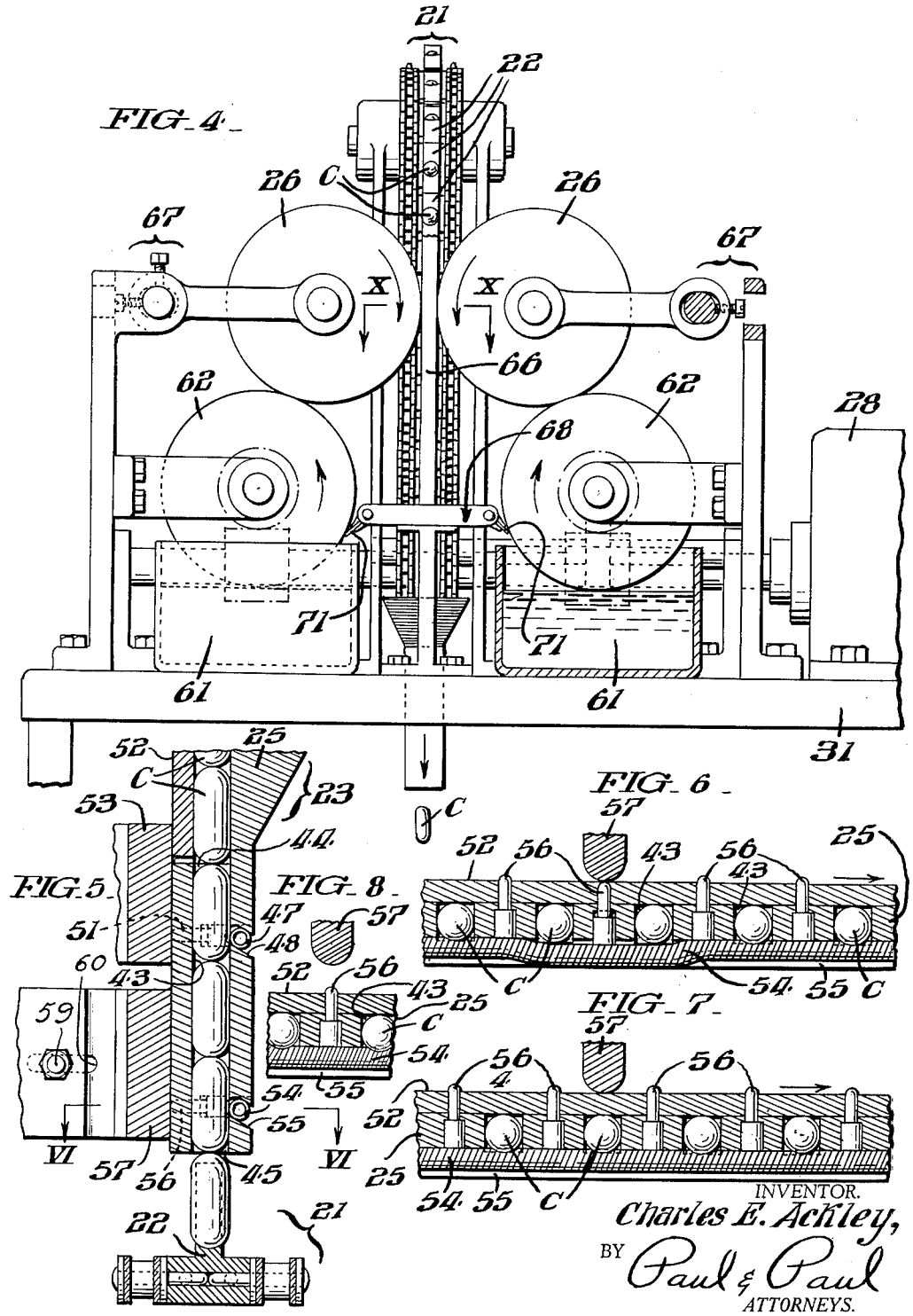

July 3, 1962 C. E. ACKLEY 3,042,183
ARTICLE HANDLING APPARATUS
Filed April 3, 1959 5 Sheets-Sheet 5
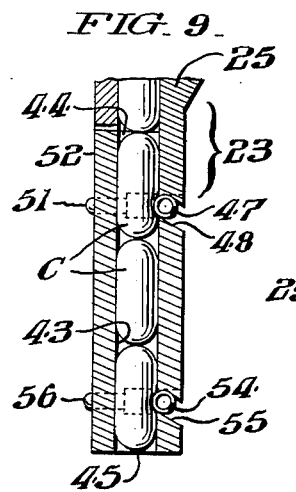
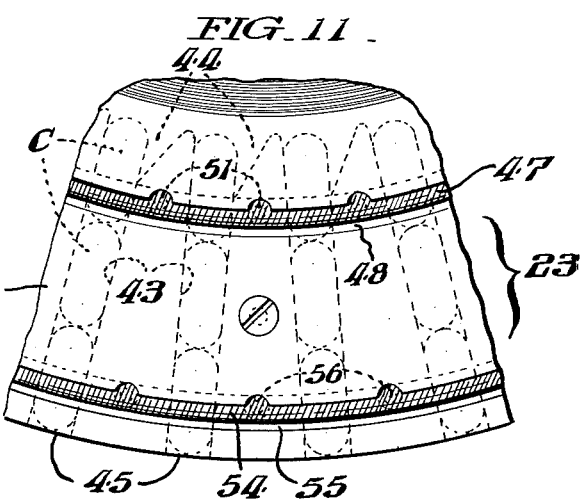
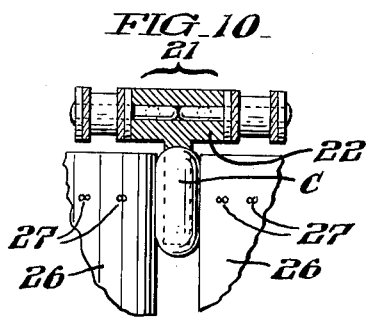
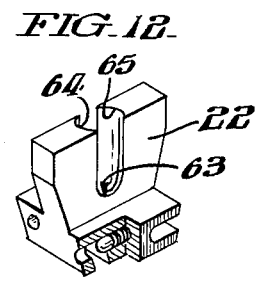
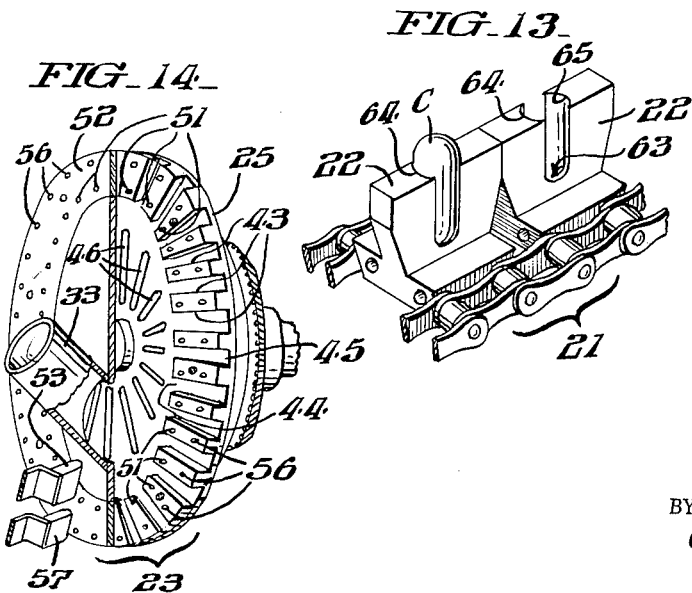
INVENTOR.
Charles E. Ackley,
BY Paul & Paul
ATTORNEYS.

United States Patent Office 3,042,183
Patented July 3, 1962

3,042,183
ARTICLE HANDLING APPARATUS
Charles E. Ackley, Philadelphia, Pa., assignor to R. W. Hartnett Company, Philadelphia, Pa., a corporation of Pennsylvania
Filed Apr. 3, 1959, Ser. No. 803,894
22 Claims. (Cl. 198—62)

This invention relates to improvements in an article handling apparatus, and more particularly concerns a machine including a power operated conveyor for handling a plurality of objects all of which are essentially of the same size and shape.

It is an object of this invention to provide an article handling machine which delivers and conveys small, fragile articles at the rate of fifty thousand per hour and up.

It is another object of this invention to provide a handling machine which has adjustments that are simple, and which are conveniently located.

It is another object of this invention to provide a handling machine with a power driven feed mechanism which is efficient and positive in its action.

It is another object to provide an article handling machine which accommodates different size articles by providing change parts.

It is another object to provide a material handling machine which may be varied as to speed so that the machine may be run at optimum speed for the objects to be handled.

Other objects and advantages of this invention, including its simplicity and economy, will further become apparent hereinafter and in the drawings, in which:

FIG. 1 is a view in side elevation of an article handling machine constructed in accordance with this invention;

FIG. 2 is a view in top plan of the machine shown in FIG. 1;

FIG. 3 is a view in end elevation and partly in section, looking from the left of FIG. 1;

FIG. 4 is a view in end elevation looking from the right of FIG. 1;

FIG. 5 is a view in section taken as indicated by the lines and arrows V—V which appear in FIG. 1;

FIG. 6 is a view in section taken as indicated by the lines and arrows VI—VI which appear in FIG. 5;

FIG. 7 is a view similar to that shown in FIG. 6 with the feed disc which forms an element of this invention having rotated a short distance;

FIG. 8 is a view similar to that shown in FIGS. 6 and 7, but with the actuating cam which forms an element of this invention being withdrawn a short distance away from the rotating disc so as to render the release mechanism thereof inoperative;

FIG. 9 represents a view in section taken as indicated by the lines and arrows IX—IX which appear in FIG. 1;

FIG. 10 represents a view in section taken as indicated by the lines and arrows X—X which appear in FIG. 4;

FIG. 11 represents a partial view on an enlarged scale of a portion of the feed disc;

FIG. 12 represents a perspective view of the carrier element of the conveyor which forms a part of this invention;

FIG. 13 is a view in perspective of two carrier elements, showing how they are positioned relative to each other;

FIG. 14 shows a view in perspective and partly cut away of the feed disc and its release mechanism; and FIG. 15 represents a partial view in section of another embodiment of the invention showing the structure of the feed disc and an associated carrier element which accommodates spherical objects.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a machine having an endless belt conveyor 21 formed of a multiplicity of carrier elements 22, a feed mechanism 23 which includes a hopper 24 and a feed disc 25, a pair of marking rolls 26 having marking indicia 27 formed thereon, and a drive means for rotating feed disc 25 and rolls 26 and for causing the movement of conveyor 21. The drive means includes an electric motor 28 which operates through the gearing as illustrated in the drawings to drive all the elements of the machine.

Hopper 24 is supported on bed plate 31 by support arm 32 and is provided with a feed chute 33 which feeds the capsules C from hopper 24 to the center portion of feed disc 25. Feed disc 25 is rotatably mounted on axis 34 which is supported by a pivoted arm 35 which has its other end pivotally supported on an axis 36 which is mounted on vertical support frame 37. To permit adjustment of the periphery of feed disc 25 as to distance from conveyor 21, arm 35 is formed integrally with another arm 38 which is pivoted on axis 36 but which has its other end provided with a locking nut and bolt 41 which is adjustable as to position within a slot 42 formed in vertical support frame 37.

Feed disc 25 includes radial passageways 43 having an entrance 44 and an exit 45 for passing capsules C from the center portion of disc 25 to the carrier elements 22 of conveyor 21.

The center portion of feed disc 25 is provided with a roughened surface such as grooves 46 to agitate the capsules C in feed chute 33 to aid in the movement of capsules C into the entrances 44 of passageways 43. The capsules C enter the passageways 43 when the passageways are positioned in the lower arc of their travel so that the capsules C fall into the passageways 43 through the force of gravity.

To prevent the capsules C from falling out of the passageways 43 through the entrance 44 as the passageways continue their travel to the top arc, there is provided a passageway entrance spring 47 which is an endless spiral spring and which fits into a circular entrance groove 48 which extends into passageways 43 near their entrances 44.

Entrance spring 47 contacts the capsules C to prevent them from falling out through the passageway entrance 44. To load passageways 43, entrance spring 47 must be moved away from the passageway and this is accomplished by providing the entrance release pins 51 which are adapted to enter entrance groove 48 to contact entrance spring 47 to move it away from passageway 43 to open the passageway for admittance of the capsules C from the feed chute 33. The other end of the pins 51 are spring-urged to project above the surface 52 of disc 25. Pins 51 are depressed by the actuating cam 53.

Capsules C are prevented from falling out of passageways 43 through exit 45 by a passageway exit spring 54, which is an endless spiral spring mounted in a circular exit groove 55 formed in the disc 25 near its periphery. Spring 54 is adapted to contact capsules C within passageways 43 to retain them against passing through the passageway exit 45.

To release capsules C from passageways 43 into the carrier elements 22 of conveyor 21, there is provided a number of exit release pins 56 which are mounted on the disc 25 with one end adapted to enter the exit groove 55 and contact the exit spring 54 to move it away from the passageway 43 to open the exit 45 and release the capsules C therethrough. The other end of the pins 56 are spring-urged to project above the surface 52 of disc 25. Exit release pins 56 are actuated to release the capsules C from the passageways 43 by the action of a release cam 57 which depresses the pin to move aside the exit spring 54 to deposit the capsules C in the carrier element 22 when the carrier element 22 is in register with the passageway exit 45. Release cam 57 is adjustable as to its position relative to feed disc 25.

Release cam 57 may be withdrawn from the position wherein it acts to depress the release pins 51 by loosening nut 59 and by sliding cam 57 along slot 60. This allows the machine to continue running even though it is not desired to continue to feed capsules C through the rolls 26. This is of advantage, for example, during lunch period when there is no operator available to supervise the running of the machine. The ink is contained in ink pans 61, and the rotation of ink rolls 62 keeps the ink from drying out, so it is advantageous to keep the machine running in order to keep the ink from drying out.

Carrier elements 22 are provided with a seat 63 (referring more particularly to FIG. 13) having shoulders 64, 65 which conform to the shape of the capsules C. The longitudinal axis of seat 63 is positioned at right angles to the direction of travel of carrier elements 22.

A guide 66 is provided which retains the capsules C in the seat 63 of carrier element 22 when the carrier element is travelling in a substantially vertical direction through the rolls 26.

In FIG. 15 is shown a conveyor 21a comprising an alternative form of carrier element 22a adapted to receive and carry spherical objects, such as round pharmaceutical pellets and the like.

Adjusting mechanism 67 is provided for moving the rolls 26 away from the rolls 62 when the machine is not in use. This is of advantage since it prevents the formation of flats between the rolls, yet otherwise leaves the marking machine in operating condition with the gears engaged.

Scraping mechanism 68 is provided for rolls 62, and mechanism 68 includes spring steel blades 71 which are pointed downwardly against the direction of rotation of the rolls 62. Spring steel blades 71 avoid the build up of ink or foreign abrasive material on rolls 62, and the mounting with the blade 71 pointed downwardly is of advantage since less pressure is needed between the blade 71 and the rolls 62 than was heretofore required. This results in a longer life of the rolls 62.

In operation, the marking machine is started by turning on the electric motor 28 and setting it to the desired speed. This starts the rotation of ink rolls 62 in ink pan 61, and ink rolls 62 transfer the ink to the marking rolls 26 which have impressed thereon the marking indicia 27.

The carrier elements 22 are driven along in the conveyor path and passed beneath the feed disc 25.

Hopper 24 is supplied with capsules C which fall by gravity through chute 33 into the center portion of the rotating feed disc 25. Grooves 46 of feed disc 25 agitate the capsules C and aid their entrance into the passageways 43. Capsules C enter the passageways 43 when entrance spring 47 is released through the action of actuating cam 53 which depresses the entrance release pins 51 to push aside the passageway entrance spring 47.

The capsules C within passageways 43 are released through exit 45 through the action of release cam 57 which depresses the exit release pins 56 to push aside the exit spring 54 and deposit the capsules C in the seat 63 of the carrier element 22. This occurs when carrier element 22 is in register with a passageway 43.

Although this invention has particular advantage when applied to the handling of fragile articles such as capsules and other packages, particularly those of unusual shapes which are difficult to handle with ordinary equipment, it will be appreciated that any objects may be handled which are all of essentially the same shape and size. Such objects include nuts, bolts, candy, electrical resistors and many other items.

Although this invention has been disclosed in specific form in conjunction with article marking means, it will be appreciated that the article feeding and conveying means in accordance with this invention may be utilized in combination with a wide variety of other article processing operations instead.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. In a power driven machine for handling articles all of which are essentially of the same size and shape, an endless belt conveyor, a multiplicity of carrier elements connected to said conveyor, conformable retaining means in said carrier elements for receiving and positively retaining individual articles with opposite lateral sides of the articles exposed and projecting at right angles to the path of said conveyor, hopper means adapted to contain a supply of said articles, adjustable feed disc means arranged above said conveyor for receiving said articles from said hopper means centrally thereof and for retaining and dispensing said articles to the retaining means of said carrier elements at the periphery thereof, means for driving said conveyor at a predetermined speed, interconnected driving means for driving said feed disc means at a peripheral linear speed which is equal to that of said conveyor.

2. The article handling machine defined in claim 1 wherein said retaining means in said carrier elements include a seat having shoulders which conform to the shape of the article with the longitudinal axis of the seat being positioned at right angles to the direction of carrier element travel.

3. The article handling machine defined in claim 1, wherein means are provided for moving said disc to a desired distance relative to said conveyor.

4. The article handling machine defined in claim 1, wherein said feed disc means comprises a disc rotatable about a horizontal axis, a plurality of radially disposed passageways having an entrance and an exit formed in the disc for passing articles from the center portion entrance of the disc to the periphery exit thereof, said disc being mounted so that its central portion entrance of the passageways receives articles from said hopper and so that said exit of said passageways deposits the articles into the retaining means of said carrier elements, feed retaining means for holding the articles in said passageways, and feed releasing means for releasing said articles from said passageways into the retaining means of said carrier elements.

5. The article handling machine defined in claim 4, wherein said feed retaining means includes means for preventing the articles from passing through the passageway exit comprising a passageway exit spring, said disc having a circular exit groove formed therein near its periphery and extending into said passageways, said exit spring being positioned in said exit groove and adapted to contact the articles within said passageways to retain them against passing through said passageway exit.

6. The article handling machine defined in claim 5, wherein said feed releasing means includes means for releasing the articles from the passageway exit comprising a release pin mounted on said disc with one end adapted to enter said exit groove and contact said exit spring to move it away from the passageway to release the article, the other end of the pin being spring-urged to project outwardly of the surface of the disc, and actuating means mounted on the machine in such a position as to contact and depress said pin when a passageway is in register with the retaining means of said carrier element to release an article from the passageway exit.

7. The article handling machine defined in claim 6, wherein means are provided for de-activating said actuating means without shutting down the machine or even stopping the rotation of said disc.

8. The article handling machine defined in claim 7, wherein said actuating means comprises a cam mounted on a fixed support positioned at one side of said feed disc means, and wherein said deactivating means comprises a slot in said support for adjusting the position of said cam toward and away from said disc.

9. The article handling machine defined in claim 4, wherein means are provided for preventing the articles from passing out of said passageways through the entrance thereof, said means comprising a passageway entrance spring, said disc having a circular entrance groove formed therein and extending into said passageways near the passageway entrance, said spring being positioned in said entrance groove and adapted to contact the articles to prevent them from falling out through the passageway entrance.

10. The article handling machine defined in claim 9, wherein means are provided for releasing said passageway entrance spring to permit articles to enter the passageway, said means comprising a release pin mounted on said disc with one end adapted to enter said entrance groove and contact said entrance spring to move it away from the passageway to open the passageway, the other end of the pin being spring-urged to project outwardly of the surface of the disc, and actuating means mounted on the machine in such a position as to contact and depress said pin when the passageway is in position to receive another article.

11. Mechanism for feeding elongate objects to an endless chain provided with spaced pockets to receive individual elongate objects, said mechanism comprising a horizontal axis wheel positioned above the endless chain, said wheel having a hollow center to serve as a reservoir for the objects and a series of radial apertures in its periphery open at their inner ends to receive individual objects as the wheel is rotated; stop means by which the objects are retained in the radial passages; means for rotating the wheel at a peripheral speed corresponding to the linear speed of the chain; and means operative to actuate the stop means to successively release the objects from the bottom of the wheel to fall into the pockets of the chain.

12. Feed mechanism for feeding a plurality of objects all of which are essentially of the same size and shape, comprising a hollow disc rotatable about a generally horizontal axis, said disc having an entrance for said objects located in the area of the center of said disc, means for feeding said objects to said entrance, a plurality of radially disposed passageways each having an entrance and an exit formed in the disc for passing objects from the entrance of the disc to the periphery exit thereof, feed retaining means for holding the objects in said passageways, feed releasing means positioned along said passageways and arranged for selectively operating said retaining means for releasing said objects from said passageways 13. The feed mechanism defined in claim 12, wherein said feed retaining means includes means for preventing the objects from passing through the passageway exit comprising a passageway exit spring, said disc having a circular exit groove formed therein near its periphery and extending into said passageways, said exit spring being positioned in said exit groove and adapted to contact the objects within said passageways to retain them against passing through said passageway exit.

14. The feed mechanism defined in claim 12, wherein said feed releasing means includes means for releasing the objects from the passageway exit comprising a release pin mounted on said disc with one end adapted to enter said exit groove and contact said exit spring to move it away from the passageway to release the object, the other end of the pin being spring-urged to project outwardly of the surface of the disc, and actuating means mounted on the machine in such a position as to contact and depress said pin when a passageway is in register with the retaining means of said carrier element to release an object from the passageway exit.

15. The feed mechanism defined in claim 14, wherein means are provided for de-activating said actuating means without shutting down the machine or even stopping the rotation of said disc.

16. The feed mechanism defined in claim 12, wherein means are provided for preventing the objects from passing out of the passageways through its entrance, said means comprising a passageway entrance spring, said disc having a circular entrance groove formed therein and extending into said passageways near the passageway entrance, said spring being positioned in said entrance groove and adapted to contact the objects to prevent them from falling out through the passageway entrance when they are located above said entrance.

17. The feed mechanism defined in claim 16, wherein means are provided for releasing said passageway entrance spring to permit objects to enter the passageway, said means comprising a release pin mounted on said disc with on end adapted to enter said entrance groove and contact said entrance spring to move it away from the passageway to open the passageway, the other end of the pin being spring-urged to project outwardly of the surface of the disc, and actuating means mounted on the surface of the disc, and actuating means mounted on the machine in such a position as to contact and depress said pin when the passageway is in position to receive another of said objects.

18. Apparatus for feeding objects which are similar in size and shape comprising storage means for the objects, a rotatable member having a generally circular periphery extending both above and below the axis of rotation of said member, means for rotating said member, said member having an object-receiving and storing space, means for conducting said objects from said storage means to said space, means forming a plurality of generally radially arranged channels extending from said space to said periphery, said channels forming individual passages for the objects, stop means coacting with said channels adjacent said periphery having capacity selectively to block and unblock said channels, means responsive to rotation of said member for operating said stop means to deliver said objects at a predetermined position, additional stop means spaced radially inwardly from said periphery and coacting with said channels to prevent said objects from dropping out of said channels when they are located above said center of rotation, and additional means responsive to rotation of said member for operating said additional stop means to open said channels when said objects are below said center of rotation.

19. Apparatus for feeding objects which are similar in size and shape comprising storage means for the objects, a rotatable member having a generally circular periphery extending both above and below the axis of rotation of said member, means for rotating said member, said member having an object-receiving and storing space near its center, means for conducting said objects from said storage means to said space, means forming a plurality of generally radially arranged channels at said periphery, said channels being shaped according to the shapes of the objects, stop means coacting with said channels adjacent said periphery having capacity selectively to block and unblock said channels, means responsive to rotation of said member for operating said stop means to deliver said objects at a predetermined position, additional stop means spaced radially inwardly from said periphery and coacting with said channels to prevent said objects from dropping out of said channels when they are located above said center of rotation, and additional means responsive to rotation of said member for operating said additional stop means to open said channels when said objects are below said center of rotation.

20. Apparatus for feeding objects which are similar in size and shape comprising storage means for the objects, a rotatable member having a generally circular periphery extending both above and below the axis of rotation of said member, means for rotating said member, said member having an object-receiving and storing space near its center, means for conducting said objects from said storage means to said space, means forming a plurality of generally radially arranged channels at said periphery, said channels being shaped according to the shapes of the objects, stop means in the form of a peripherally arranged continuous helical spring positioned under tension in a continuous groove and coacting with said channels adjacent said periphery, a plurality of spring-displacing members spaced along said periphery, cam means in a fixed predetermined location relative to said rotatable member and successively operative upon said displacing members to move said spring and thereby open a passage adjacent said displacing member, said spring being returned to a position closing said channel by reason of its own tension after the displacing member is past said cam means, additional stop means spaced radially inwardly from said periphery and coacting with said channels to prevent said objects from dropping out of said channels when they are located above said center of rotation, and additional means responsive to rotation of said member for operating said additional stop means to open said channels when said objects are below said center of rotation.

21. In an article conveying apparatus for conveying a multiplicity of articles all of which are of similar size and shape, the combination which comprises means forming a continuous conveyor having a plurality of substantially equally spaced conformable receptacles arranged for positive retention of the articles, said conveyor having a lower portion, a pair of spaced upright portions one of which is higher than the other, and an upper inclined portion extending between said upright portions, power means for driving said conveyor, an article feed disc located above and tangentially related to said upper inclined conveyor portion, an arm mounted on a pivot located below said inclined portion, said arm extending above said inclined portion and forming a support for said disc, and means for adjusting said arm about said pivot to a fixed position, thereby adjusting the periphery of said disc toward and away from said inclined conveyor portion.

22. An article handling machine for handling articles all of which are essentially of the same size and shape comprising a conveyor for the articles, said conveyor being mounted on a frame, said conveyor having a plurality of spaced conformable receptacles arranged for positive retention of the articles, article storage means above the conveyor, an article feeding disc located directly above said conveyor, an upright arm supporting said disc and removably connected to the conveyor frame, said disc having a removable replaceable member to facilitate handling articles of different sizes and shapes, power drive means connected to drive the conveyor, and power take off means geared to the conveyor drive means and to the disc and extending up said arm, whereby said geared take off means is readily removable with said arm and said disc.

References Cited in the file of this patent
UNITED STATES PATENTS

| | | |
|---|---|---|
| 1,613,923 | Bixby | Jan. 11, 1927 |
| 2,101,924 | Turnquist | Dec. 14, 1937 |
| 2,292,864 | Bidwell | Aug. 11, 1942 |
| 2,538,706 | Reynolds et al. | Jan. 16, 1951 |
| 2,684,781 | Allen et al. | July 27, 1954 |
| 2,807,352 | Terry et al. | Sept. 24, 1957 |
| 2,859,689 | Ackley | Nov. 11, 1958 |